US008376319B2

(12) United States Patent
Chen et al.

(10) Patent No.: US 8,376,319 B2
(45) Date of Patent: Feb. 19, 2013

(54) HYDRAULIC JACK CAPABLE OF DISPLAYING LOAD AND OVERLOAD WARNING

(75) Inventors: Jiang Chen, Jiangsu (CN); Min Shen, Jiangsu (CN); Jingfang Wang, Jiangsu (CN)

(73) Assignee: Changshu Tongrun Auto Accessory Co., Ltd, Jiangsu (CN)

( * ) Notice: Subject to any disclaimer, the term of this patent is extended or adjusted under 35 U.S.C. 154(b) by 309 days.

(21) Appl. No.: 12/772,765

(22) Filed: May 3, 2010

(65) Prior Publication Data

US 2011/0073822 A1 Mar. 31, 2011

(30) Foreign Application Priority Data

Sep. 25, 2009 (CN) .......................... 2009 1 0232879

(51) Int. Cl.

*B62B 3/06* (2006.01)
*B66F 5/02* (2006.01)
*B66F 5/04* (2006.01)
*B66F 3/24* (2006.01)
*A62B 3/00* (2006.01)
*E21D 15/44* (2006.01)

(52) U.S. Cl. ..... 254/93 R; 254/8 R; 254/9 B; 254/10 B; 254/2 B

(58) Field of Classification Search .................. 254/8 R, 254/9 B, 10 B, 2 B, 93 R, 900
See application file for complete search history.

(56) References Cited

U.S. PATENT DOCUMENTS 5,417,536 A * 5/1995 Cech .............................. 414/21
5,677,701 A * 10/1997 Okuyama et al. ................. 345/7
6,855,894 B1 * 2/2005 Van Seumeren ............. 177/130

FOREIGN PATENT DOCUMENTS

CN 2131847 Y 5/1993
CN 2331648 Y 8/1999
CN 2371548 Y 3/2000
CN 2714529 Y 8/2005

* cited by examiner

*Primary Examiner* — Monica Carter
*Assistant Examiner* — Seahee Yoon
(74) *Attorney, Agent, or Firm* — Christie, Parker & Hale, LLP

(57) ABSTRACT

A hydraulic jack capable of displaying load and overload warning, belonging to the technical field of hydraulic lifting equipment. It comprises: a base, a lifting arm, a pump body, a handle, and a tray, wherein, a signal collection assembly designed to sense the load on the tray is arranged at the end of the lifting arm, and the signal collection assembly is electrically connected to a weighing controller arranged on either the base or the pump body, and the tray is arranged on the signal collection assembly. Since a signal collection assembly designed to sense the load on the tray is arranged at the end of the lifting arm and electrically connected to the weighing controller, the load sensing method by the aid of communication with the oil circuit in the prior art is abandoned and the leakage of hydraulic oil can be avoided; since the signal collection assembly is arranged at the end of the lifting arm, the entire assembly can be easily processed, installed, and maintained.

7 Claims, 5 Drawing Sheets

HYDRAULIC JACK CAPABLE OF DISPLAYING LOAD AND OVERLOAD WARNING

CROSS-REFERENCE TO RELATED APPLICATION

This application claims priority to and the benefit of Chinese Patent Application No. 200910232879.1, filed in the Chinese Intellectual Property Office on Sep. 25, 2009, the entire content of which is incorporated herein by reference.

FIELD OF THE INVENTION

The present invention relates to the technical field of hydraulic lifting equipment, in particular to a hydraulic jack that can display load and overload warning.

BACKGROUND OF THE INVENTION

Hydraulic jacks are widely used due to its advantages including compact structure, stable operation, light weight, portability, etc. In other words, hydraulic jacks are simple hydraulic lifting utilities, and can be used on vehicles as driver's tools; in addition, they are equipped in vehicle maintenance departments, vehicle test departments, fire departments and even engineering construction units. As known by those skilled in the art, the common drawbacks of hydraulic jacks lies in limited lifting height and low lifting speed, leading to low working efficiency; therefore, a great of effort has been made in the industry to overcome the drawbacks, as is manifested by the technical solution of the oil jack lifting to top in idle stroke with one pump disclosed in Chinese Utility Model Patent Publication No. CN 2331648Y. It seems that the load safety of hydraulic jacks has been neglected. The actual situation is: in some special cases, it is difficult to judge whether a lifting jack can jack up a heavy object because the load is not clear; especially in the case where the safety load limit unit of lifting jack is adjusted and thereby the protection of lifting jack is lost, overloading will damage the lifting jack, and even cause adverse chain reactions, for example, the lifted heavy object may drop suddenly and thereby be damaged, and even cause more severe accidents (e.g., personal safety is endangered).

A lifting jack with pressure gauge is provided in Chinese Utility Model Patent Publication No. CN2131847Y. On the lifting jack, a hole that communicates with the bottom of an oil chamber is arranged on the bottom of the base, one end of an oil tube is connected to the hole, and the other end of the oil tube protrudes from the base and is connected with a connector, on which a pressure gauge is mounted. A hydraulic jack capable of weighing and measuring force is introduced in Chinese Utility Model Patent Publication No. CN2371548Y. In the technical solution of CN2371548Y, the oil return valve on the lifting jack is removed and replaced with a pipe joint, wherein, one end of the pipe joint is fitted with the pipe of the oil circuit through thread connection, and the other end of the pipe joint is fitted with a pressure gauge through thread connection. A multi-purpose vertical hydraulic jack with a pressure gauge is put forward in CN2714529Y. The technical solution of the multi-purpose vertical hydraulic jack is: a pressure gauge interface is arranged at a side where the casing of lifting jack base and piston barrel interface is located; the pressure gauge interface communicates with the piston barrel through the oil circuit, and the pressure gauge is connected with the pressure gauge interface via a flexible pipe joint assembly (see line 10 on page 2 to line 2 on page 3 in the description).

A common advantage of the three above mentioned patents is that the load and pressure can be displayed when the lifting jack lifts up, therefore blind operation can be avoided, and the trouble can be nipped in the bud to a certain degree. However, there are undeniable common drawbacks: firstly, since "operations" have to be made to the base of lifting jack, the machining work is complicated; secondly, the leak tightness is a crucial factor for judging the quality of lifting jack and leakage (oil leakage) is taboo for lifting jacks, but in all three of the above-mentioned patents, the pressure gauge communicates with the oil circuit, and consequently increases the probability of leakage from lifting jack. It is inadvisable for the setting mode of pressure gauge to arrange the pressure gauge to communicate with the oil circuit in terms of technical feasibility and actual applicability. Not only does this apply to the leak tightness of pressure gauge positioning units, such as the connector, pipe joint, pressure gauge interface, and base joint as described in the three above-mentioned patents, but also the leak tightness between pressure gauge and connector, pipe joint, and pressure gauge interface, should be considered. In case leakage occurs in any of the sealing links, the lifting jack could not be used. Thirdly, the indication error of the pressure gauge is big, especially, when the observer observes at a position that is offset from the front of the pressure meter, the load judgment may be inaccurate due to viewing angle factor.

SUMMARY OF THE INVENTION

The primary object of the present invention is to provide a hydraulic jack capable of displaying load and overload warning, which can avoid leakage phenomenon due to not communicating with the hydraulic oil circuit, and which can be easily processed and installed without improving the base.

Another object of the present invention is to provide a hydraulic jack capable of displaying load and overload warning, with which any position change of the observer does not affect reading indication, and thereby the load can be read and mastered accurately.

To accomplish the primary object of the present invention, the present invention provides the following technical solution: a hydraulic jack capable of displaying load and overload warning, comprising a base, a lifting arm, a pump body, a handle, and a tray, wherein, a signal collection assembly designed to sense the load on the tray is arranged at the end of the lifting arm, and said signal collection assembly is electrically connected to a weighing controller arranged on either the base or the pump body, and the tray is arranged on the signal collection assembly.

To accomplish the other object of the present invention, the present invention provides the following technical solution: the weighing controller is a weighing controller with warning function where the load is displayed in LCD.

In an embodiment of the present invention, the signal collection assembly comprises a bracket, a strain foil base, and a strain foil, wherein, the bracket is hinged to the end of the lifting arm; a bracket shaft sleeve hole is arranged at the center of the bracket; the strain foil base is fixed to the bracket; a through-hole is arranged at the center of the strain foil base; a first strain foil slot is arranged around the through-hole at the side where the strain foil base faces the tray; the strain foil is embedded in the first strain foil slot and electrically connected to the weighing controller; the tray is arranged on the strain foil base, and the strain foil contacts the tray.

In another embodiment of the present invention, a tray fitting pole extends from the center of the bottom of the tray into the through-hole and the bracket shaft sleeve hole.

In another embodiment of the present invention, a first lead hole is arranged on the bracket, a second lead hole is arranged on the strain foil base, and the weighing controller is electrically connected with the strain foil via lead wires through the first and second wiring holes.

In another embodiment of the present invention, a second strain foil slot is arranged around the through-hole at the side where the strain foil base faces the bracket, a strain foil is embedded in the second strain foil slot, and the strain foil contacts the bracket and is electrically connected to the weighing controller.

In another embodiment of the present invention, the weighing controller has a hinge part designed to enable the weighing controller to be revolved and folded, and the hinge part is fitted to a hinge base arranged on the base or pump body.

In another embodiment of the present invention, the signal collection assembly further comprises a shaft sleeve with a shaft sleeve hole at the center, wherein, the lower end of the shaft sleeve is fitted into the bracket shaft sleeve hole, and the upper end of the shaft sleeve is held in the through-hole and protrudes out of the through-hole; the tray is fitted to the shaft sleeve.

In the technical solution provided in the present invention, since a signal collection assembly designed to sense the load on the tray is arranged at the end of the lifting arm and electrically connected to the weighing controller, the known load sensing method by the aid of communication with the oil circuit in the prior art is abandoned, and also the leakage of hydraulic oil can be avoided; since the signal collection assembly is arranged at the end of the lifting arm, the entire assembly can be easily processed, installed, and maintained.

DETAILED DESCRIPTION OF THE EMBODIMENTS

To allow the examiner of the Patent Office and the public to more clearly understand the technical features and beneficial effects of the present invention, hereinafter the present invention will be described in embodiments with reference to the accompanying drawings. However, the description of the embodiments shall not be deemed as limited to the technical solution of the present invention, and any equivalent variations or modifications to the embodiments without departing from the spirit of the present invention should be deemed as falling within the protection scope of the technical solution of the present invention.

Figure 1:
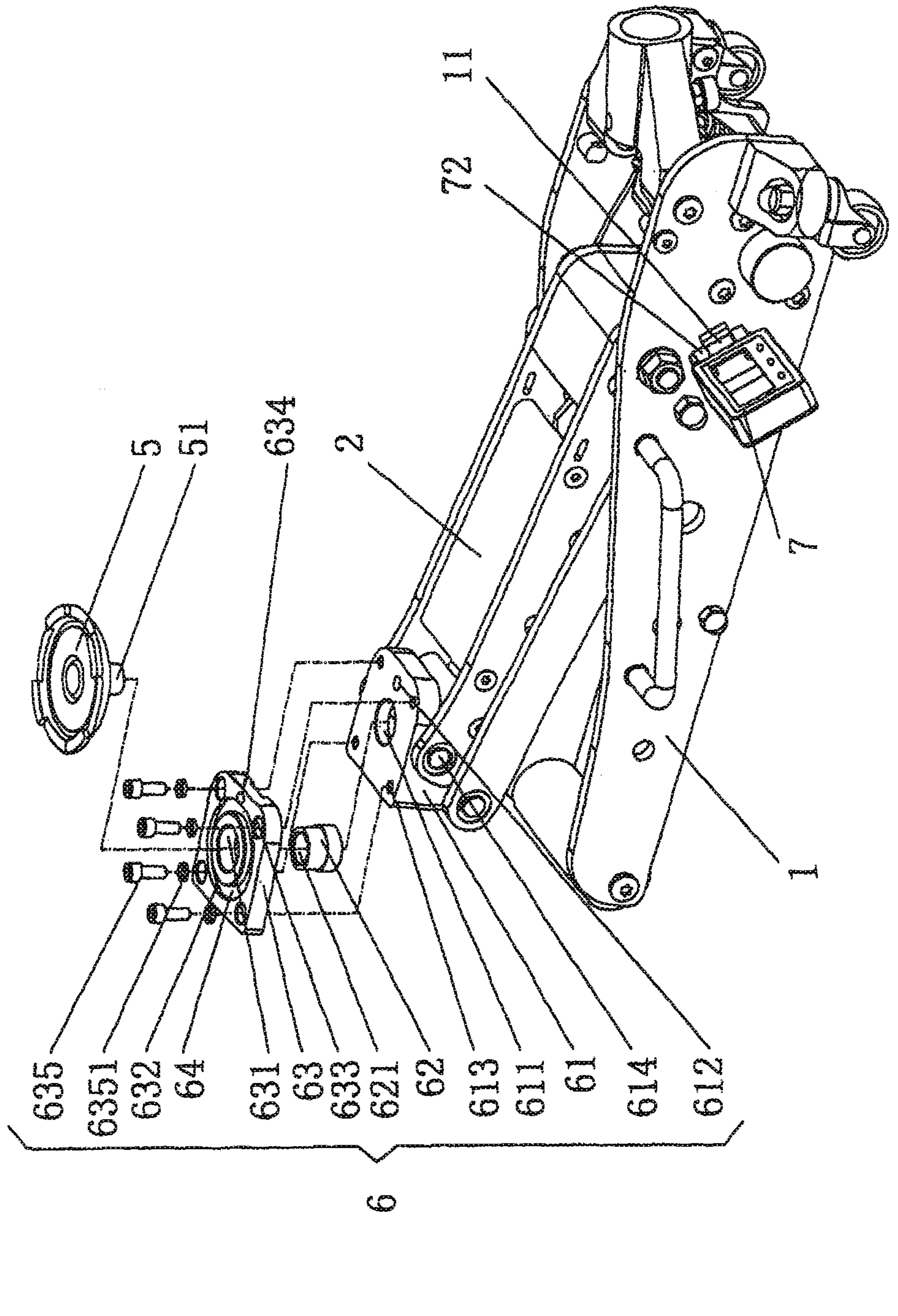
FIG. 1 is a structural diagram of an embodiment of the present invention.
Figure 3:
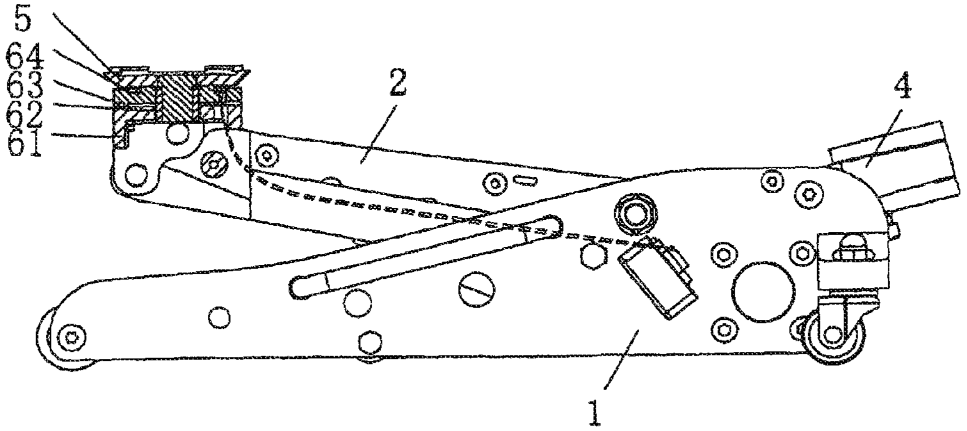
FIG. 3 is a schematic diagram of electrical connection between the signal collection assembly 6 and the weighing controller 7 in the present invention.
Figure 4:
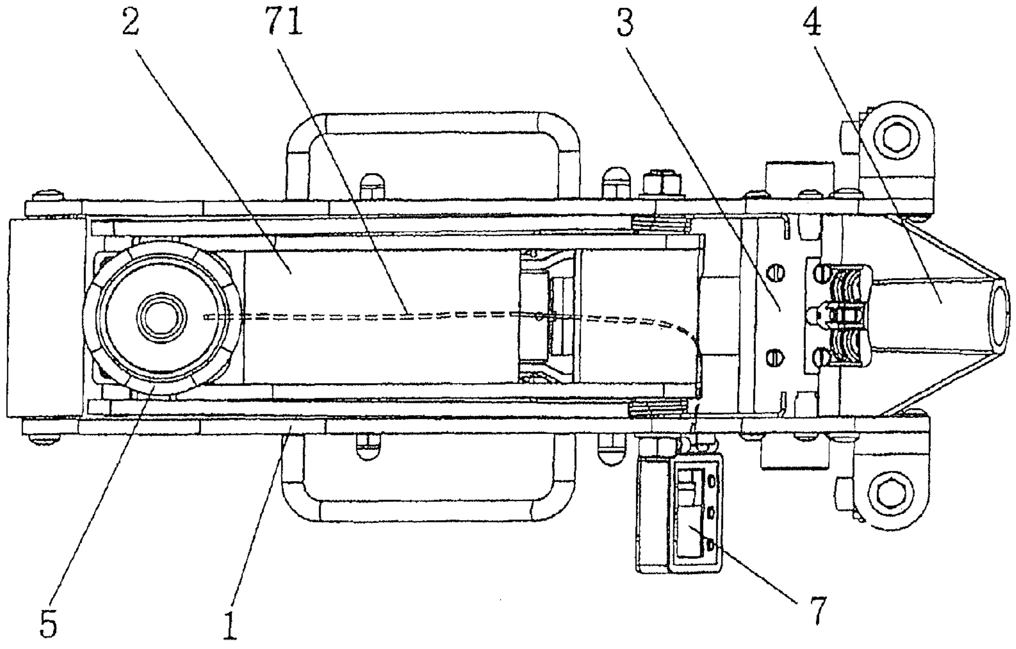
FIG. 4 is a top view of the structure shown in FIG. 2.

Please refer to FIG. 1, FIG. 3, and FIG. 4. Since the embodiment is directed to a scissor jack that belongs to the horizontal jacks, the base 1 is composed of a pair of symmetric wall boards. Likewise, the lifting arm 2 is composed of a pair of symmetric arm boards; one end of the lifting arm 2 (i.e., the right end as shown in FIG. 1, FIG. 3, and FIG. 4) is hinged (or "pivotally jointed") to the base 1, and the other end of the lifting arm 2 (i.e., the left end as shown in FIG. 1, FIG. 3, and FIG. 4) is a free end. The pump body 3 is arranged on the base 1, and the handle 4 is connected to the pump body 3. Please refer to FIG. 1. As a technical point of the technical solution of the present invention, a signal collection assembly 6 is arranged on the left end of the lifting arm 2 (i.e., the free end of the lifting arm 2), and the structure of the signal collection assembly 6 is preferred (but not limited to) as follows: a bracket 61 is arranged on the lifting arm 2 via a shaft 614, a bracket shaft sleeve hole 611 is arranged at the center of the bracket 61, and a set of screw holes 613 (which quantity is not limited to the quantity shown in FIG. 1) are arranged around the bracket 61. In addition, a first lead hole 612 is arranged on the bracket 61; a through-hole 631 is arranged at the center of a strain foil base 63, a set of fixing holes 633 in the same quantity as the screw holes 613 and corresponding to the screw holes 613 in position are arranged around the strain foil base 63; the fixing holes 633 are connected to the screw holes 613 with fixing screws 635 and gaskets 6351, so that the strain foil base 63 is fixed to the bracket 61; a first strain foil slot 632 is arranged around the through-hole 631 at the side where the strain foil base 63 faces the tray 5 (i.e., upper side as shown in FIG. 1). In addition, a second lead hole 634 is arranged on the strain foil base 63; a strain foil 64 is arranged in the first strain foil slot 632, and the strain foil 64 is a pressure sensor in nature. In this embodiment, the strain foil 64 is preferably (but not limited to) a Wolong elastic sensing element produced by Beijing Wolong Sensor Technology Development Co., Ltd., China. A tray fitting pole 51 extends from the center of the bottom of the tray 5 described above into the through-hole 631 and the bracket shaft sleeve hole 611 this embodiment, a weighing controller 7 is mounted on one side of the base 1. However, the present invention is not limited to that. For example, the weighing controller 7 can be mounted on the pump body 3, or even on the lifting arm 2. The lead wires 71 of the weighing controller 7 are led through the first and second lead holes 612 and 634 to be electrically connected to the strain foil 64. In addition, the weighing controller 7 has a hinge part 72, which is hinged to a hinge part base 11 preformed on one side of the base 1, so that the weighing controller 7 can be revolved within 360° range and can be folded. The weighing controller 7 is a weighing controller with warning function where load is displayed on LCD. In view of possible clearance resulted from machining accuracy, the signal collection assembly 6 can further comprise a shaft sleeve 62 with a shaft sleeve hole 621 at the center, wherein, the lower end of the shaft sleeve 62 is fitted in the bracket shaft sleeve hole 611, and the upper end of the shaft sleeve 62 is fitted in the through-hole 631 and protrudes out of the through-hole 631. The tray fitting pole 51 is fitted in the shaft sleeve hole 621.

Figure 2:
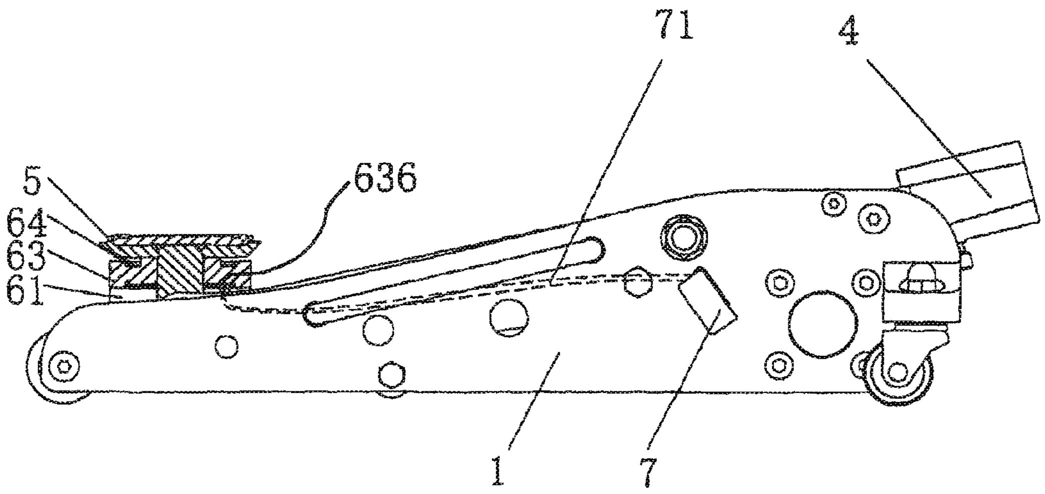
FIG. 2 is a structural diagram of another embodiment of the present invention.

Please refer to FIG. 2. In another embodiment of the present invention, a second strain foil slot 636 is arranged around the through-hole 631 at the side where the strain foil base 63 faces the bracket 61. A strain foil 64 is arranged in the second strain foil slot 636, and the strain foil 64 contacts the bracket 61 (or makes contact with the bracket 61). The rest of the parts are identical to the parts shown in FIG. 1, FIG. 2, and FIG. 3.

Figure 5:
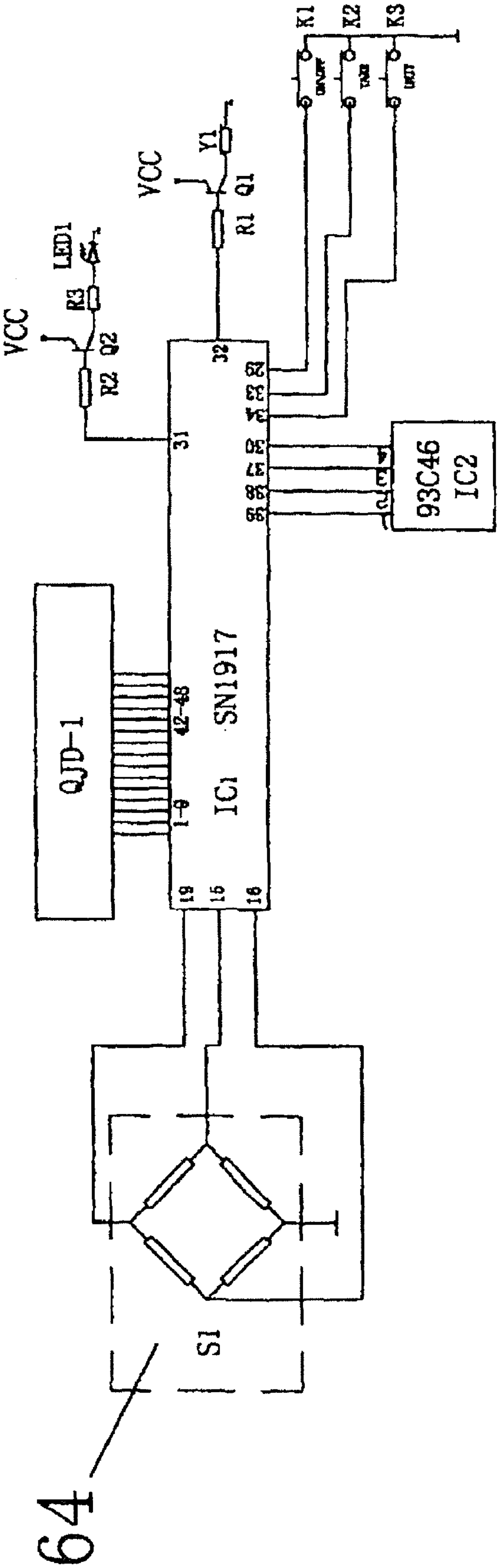
FIG. 5 is an electrical schematic diagram of the weighing controller 7 in the present invention.
Figure 6:
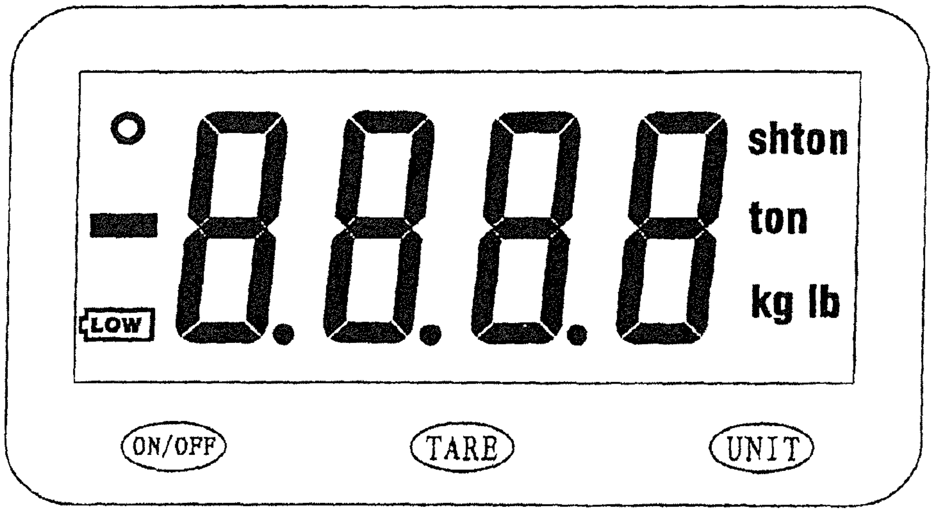
FIG. 6 is a schematic diagram of load display symbols provided by the weighing controller 7.

Please refer to FIG. 5 and FIG. 6, wherein, FIG. 5 is an electrical schematic diagram of the weighing controller 7 in the present invention. The strain foil 64 described above is a weighing sensor, and is mounted in the first strain foil slot 632 of the strain foil base 63 (in addition, a strain foil 64 can also be arranged in the second strain foil slot 636 of the strain foil base 63). A single-chip IC1 (Model SN1917) that constitutes the weighing controller 7 is electrically connected through lead wires 71 to the strain foil 64. In other words, the three output ends of the strain foil 64 are respectively connected to the pin 19, 15, and 16 of the single-chip IC1. An internal ND converter of the single-chip 101 converts the analog signals from the strain foil 64 into digital signals; the digital signals are transmitted to a LCD1 (Model QJD-1) through the pin 1-9 and pin 42-28 of the single-chip IC1, so that the weight value is displayed on the LCD1. When the weight value is displayed on the LCD1, a LED1 for backlight lights up at the same time to make the display on LCD1 clearer. The positive electrode of the backlight LED1 is connected to one end of a resistor R3, and the negative electrode of the backlight LED1 is grounded. The other end of the resistor R3 is connected to the collector electrode of a triode Q2, the emitter electrode of the triode Q2 is connected to power VCC, the base electrode of the triode Q2 is connected to one end of a resistor R2, and the other end of the resistor R2 is connected to the pin 31 of the single-chip 101, so that the resistor R2 can be utilized to drive the triode Q2 to thereby allow the backlight LED1 to light up, and the current of the backlight LED1 can be adjusted by the resistor R3. One end of a buzzer Y1 is grounded, and the other end of the buzzer Y1 is connected to the collector electrode of a triode Q1, the emitter electrode of the triode Q1 is connected to power VCC, the base electrode of the triode Q1 is connected to one end of the resistor R1, and the other end of the resistor R1 is connected to the pin 31 of the single-chip 101. In case of overload, the resistor R1 drives the triode Q1, so that the circuit is on, and the buzzer Y1 works (gives off an audible warning). In addition, a memory IC2 (Model 93C46) is shown in FIG. 5, and the memory IC2 is designed to store parameters for weight calibration. The pins 1, 2, 3, and 4 of the memory IC2 are respectively connected to the pins 39, 38, 37, and 30 of the single-chip IC1. A first key 1 (ON/OFF key) is used to turn on/off the weighing controller 7. When the first key K1 is pressed down, the weighing controller 7 will enter into working state; when the first key K1 is pressed again, the weighing controller 7 will exit working state. A second key K2 is used to reset the display to zero. After the first key K1 is pressed, if the display content on the LCD1 is not zero, the display content can be reset to zero when the second key K2 is pressed down. A third key K3 is used to switch the measuring unit; for example, when the third key K3 is pressed, the displayed weight unit can be changed. The displayed weight unit can be switched among Kg, Ton, lb, and Shton, as shown in FIG. 6. The first, second, and third keys K1, K2, and K3 are respectively connected to the pins 29, 33, and 34 of the single-chip IC1.

On the basis of above description, variations can be made easily, for example, the signal collection assembly 6 and the weighing controller 7 can be migrated onto a vertical hydraulic jack. Therefore, even if the technical solution of the present invention is applied to vertical hydraulic jacks, it should also be deemed as falling within the protection scope of the present invention.

To use the hydraulic jack in the present invention, the first key K1 of the weighing controller 7 is pressed down first; when the LCD1 displays zero (if the display content is not zero, it can be reset to zero by pressing down the second key K2), the operator can use the handle 4 to lift up the lifting arm 2 until the tray 5 reaches the object to be lifted (e.g., a vehicle); since the tray 5 contacts the strain foil 64 (or makes contact with the strain foil 64), the strain foil 64 will sense the load on the tray 5 and transmit the load signals to the single-chip IC1, and then the load signals will be displayed on the LCD1. In case the load on the tray 5 exceeds the set value stored in the memory IC2, the buzzer Y1 in the warning circuit will give off a warning. In that way, the hydraulic jack can display the load and provide overload warning. If the load on the jack is within the normal range, the buzzer Y1 will not give off any warning signal. The lifting arm 3 can be retracted simply by actuating a pressure relief valve on the pump body 3.

The invention claimed is:

1. A hydraulic jack capable of displaying load and overload warning, comprising a base (1), a lifting arm (2), a pump body (3), a handle (4), and a tray (5), wherein, a signal collection assembly (6) designed to sense the load on the tray (5) is arranged at the end of the lifting arm (2), and the signal collection assembly (6) is electrically connected to a weighing controller (7) arranged on either the base (1) or the pump body (3), and the tray (5) is arranged on the signal collection assembly (6), wherein the signal collection assembly (6) comprises a bracket (61), a strain foil base (63) and a strain foil (64), the bracket (61) is hinged to the end of the lifting arm (2); a bracket shaft sleeve hole (611) is arranged at the center of the bracket (61); the strain foil base (63) is fixed to the bracket (61), and a through-hole (631) is arranged at the center of the strain foil base (63); a first strain foil slot (632) is arranged around the through-hole (631) at the side where the strain foil base (63) faces the tray (5); the strain foil (64) is embedded in the first strain foil slot (632) and electrically connected to the weighing controller (7); the tray (5) is arranged on the strain foil base (63) the strain foil (64) contacts the tray (5).

2. The hydraulic jack capable of displaying load and overload warning according to claim 1, wherein, the weighing controller (7) is a weighing controller with warning function where the load is displayed on LCD.

3. The hydraulic jack capable of displaying load and overload warning according to claim 1, wherein, a tray fitting pole (51) extends from the center of the bottom of the tray (5) into the through-hole (631) and the bracket shaft sleeve hole (611).

4. The hydraulic jack capable of displaying load and overload warning according to claim 1, wherein, a first lead hole (612) is arranged on the bracket (61), and a second lead hole (634) is arranged on the strain foil base (63); the weighing controller (7) is electrically connected to the strain foil (64) via lead wires (71) through the first and second lead holes (612, 634).

5. The hydraulic jack capable of displaying load and overload warning according to claim 1, wherein, a second strain foil slot (636) is arranged around the through-hole (631) at the side where the strain foil base (63) faces the bracket (61), and the strain foil (64) is arranged in the second strain foil slot (636) and contacts the bracket (61) and is electrically connected to the weighing controller (7).

6. The hydraulic jack capable of displaying load and overload warning according to claim 1, wherein, the weighing controller (7) has a hinge part (72) designed to enable the weighing controller (7) to be revolved and folded, and the hinge part (72) is fitted to a hinge base arranged on the base (1) or the pump body (3).

7. The hydraulic jack capable of displaying load and overload warning according to claim 1, wherein the signal collection assembly (6) further comprises a shaft sleeve (62) with a shaft sleeve hole (621) at the center, wherein, the lower end of the shaft sleeve (62) is fitted in the bracket shaft sleeve hole (611), and the upper end of the shaft sleeve (62) is held in the through-hole (631) and protrudes out of the through-hole (631); the tray (5) is fitted to the shaft sleeve (62).

* * * * *